(12) United States Patent
Haapola et al.

(10) Patent No.: US 10,708,110 B2
(45) Date of Patent: Jul. 7, 2020

(54) SUPER-FRAME REALIGNMENT MECHANISM TO ENABLE INTER-WIRELESS SENSOR NETWORK COMMUNICATIONS

(71) Applicant: Oulun yliopisto, Oulun yliopisto (FI)

(72) Inventors: Jussi Haapola, Oulun yliopisto (FI); Tuomas Paso, Oulun yliopisto (FI)

(73) Assignee: Oulun yliopisto, Oulun yliopisto (FI)

( * ) Notice: Subject to any disclaimer, the term of this patent is extended or adjusted under 35 U.S.C. 154(b) by 0 days.

(21) Appl. No.: 16/167,739

(22) Filed: Oct. 23, 2018

(65) Prior Publication Data
US 2019/0140879 A1    May 9, 2019

(30) Foreign Application Priority Data
Nov. 7, 2017 (FI) .................................. 20175995

(51) Int. Cl.
*H04W 4/00* (2018.01)
*H04L 27/26* (2006.01)
(Continued)

(52) U.S. Cl.
CPC ..... *H04L 27/2666* (2013.01); *H04W 56/0015* (2013.01); *H04W 56/0035* (2013.01);
(Continued)

(58) Field of Classification Search
CPC .......... H04L 27/2666; H04W 56/0015; H04W 72/0446; H04W 56/0035; H04W 56/001; H04W 16/14; H04W 48/12; H04W 84/18
(Continued)

(56) References Cited

U.S. PATENT DOCUMENTS

| 8,943,305 B2 | 1/2015 | Ho |
| 9,374,831 B2 | 6/2016 | Ho |
| 2017/0251482 A1* | 8/2017 | Chin ..................... H04W 16/14 |

FOREIGN PATENT DOCUMENTS

| WO | 2016005716 A1 | 1/2016 |
| WO | 2016151273 A1 | 9/2016 |

(Continued)

OTHER PUBLICATIONS

Lee et al, A Study on Dynamic Superframe Adjustment Algorithm for IEEE 802.15.4 LR-WPAN, Conference Paper, Jan. 2010, pp. 1-5, 2010 IEEE 71st Vehicular Technology Conference.
Muthukumaran et al, MeshMAC: Enabling Mesh Networking over IEEE 802.15.4 through Distributed Beacon Scheduling, Ad Hoc Networks (ADHOCNETS 2009). Lecture Notes of the Institute for Computer Sciences, Social Informatics and Telecommunications Engineering, 2010, pp. 561-575, vol. 28. Springer, Berlin, Heidelberg.
(Continued)

Primary Examiner — Mang Hang Yeung
(74) Attorney, Agent, or Firm — Berggren LLP (57) ABSTRACT

The present invention discloses a method and a system for super-frame realignment to enable inter-wireless network communications. The networks can be Wireless Body Area Networks. In the present invention, it is checked whether the inter-beacon interval (IBI) of the data channel of the own network is of shorter or longer duration than the IBI of the data channel of the target network, and if the IBI of the data channel of the own network does not have exactly the same duration as the IBI of the data channel of the target network, the own network allocates its own inactive (304) and/or active periods so that an integer multiple of its forthcoming IBI will correspond to the IBI of the target network, or the forth-coming IBI of the own network will correspond to an integer multiple of the IBI of the target network.

18 Claims, 4 Drawing Sheets

(51) Int. Cl.
　　　*H04W 56/00* (2009.01)
　　　*H04W 72/04* (2009.01)
　　　*H04W 84/18* (2009.01)
　　　*H04W 16/14* (2009.01)
　　　*H04W 48/12* (2009.01)
(52) U.S. Cl.
　　　CPC ........ *H04W 72/0446* (2013.01); *H04W 16/14* (2013.01); *H04W 48/12* (2013.01); *H04W 56/001* (2013.01); *H04W 84/18* (2013.01)
(58) Field of Classification Search
　　　USPC .......................................................... 370/329
　　　See application file for complete search history.

(56) References Cited

FOREIGN PATENT DOCUMENTS

| WO | WO-2016151273 A1 * | 9/2016 | ............ H04W 16/14 |
|---|---|---|---|
| WO | 2007008174 A1 | 1/2017 | |

OTHER PUBLICATIONS

Bennis et al, Inter Base Station Resource Sharing and Improving the Overall Efficiency of B3G Systems, Conference Paper, Oct. 2007, pp. 1494-1498, 2007 IEEE 66th Vehicular Technology Conference.

Shabani et al, Smart Zigbee/IEEE 802.15.4 MAC for Wireless Sensor Multi-Hop Mesh Networks, Conference Paper, Jun. 2013, pp. 282-287, 2013 IEEE 7th International Power Engineering and Optimization Conference.

Finnish Patent and Registration Office, Search report of Finnish application No. 20175995, dated May 28, 2018, 2 pages.

Finnish Patent and Registration Office, Office action for Finnish application No. 20175995, dated May 28, 2018, 5 pages.

LAN/MAN Standards Committee of the IEEE Computer Society, P802.15.8/D4, Draft Standard for Wireless Medium Access Control (MAC) and Physical Layer (PHY) Specifications for Peer Aware Communications (PAC), Mar. 2017.

European Patent Office, Search Report of European Patent Application EP18202193, dated Jan. 31, 2019, 3 pages.

* cited by examiner

SUPER-FRAME REALIGNMENT MECHANISM TO ENABLE INTER-WIRELESS SENSOR NETWORK COMMUNICATIONS

PRIORITY

This application claims priority of Finland application, No. 20175995, filed on 7 Nov. 2017 the content of which is incorporated herein by reference.

FIELD OF THE INVENTION

The present invention relates to Wireless Body Area Networks (WBANs) which are defined by IEEE standard 802.15.6 and ETSI technical committee "SmartBAN" specifications of the physical (PHY) and medium access control (MAC) for packet-based short-range communications.

BACKGROUND OF THE INVENTION

The Institute of Electrical and Electronics Engineers (IEEE) standard 802.15.6 and The European Telecommunications Standards Institute (ETSI) technical committee "SmartBAN" define physical and medium access control specifications for packet-based short-range communications in wireless body area networks (WBANs). WBANs target e.g. medical and healthcare monitoring systems in the vicinity of a human body, or inside the human body.

Standard [1], i.e. IEEE standard 802.15.6-2012, "IEEE Standard for Local and metropolitan area networks - Part 15.6: Wireless Body Area Networks", IEEE Computer Society, LAN/MAN Standards Committee, Feb. 29, 2012 discloses a standard for short-range, wireless communication in the vicinity of, or inside, a human body (but not limited to humans). The communication networks use existing industrial-scientific-medical (ISM) frequency bands as well as bands approved by national medical and/or regulatory authorities. MAC frame formats, MAC functions, security services, and physical layer specifications are discussed in this standard covering Wireless Body Area Networks.

Standard [2], i.e. Smart Body Area Network (SmartBAN), "Enhanced Ultra-Low Power Physical Layer", ETSI TS 103 326 V1.1.1, April 2015 discloses ETSI specifications for ultra-low power physical layer of the SmartBANs. It further applies to short-range, wireless communication between wearable sensors or devices and the hub coordinator, and it specifies the physical layer for transmitting on the medium. Packet formats, modulation and forward error correction (FEC) algorithms are discussed.

Standard [3], i.e. Smart Body Area Network (SmartBAN), "Low Complexity Medium Access Control (MAC) for SmartBAN", ETSI TS 103 325 V1.1.1, April 2015 discloses the MAC protocol specification designed to facilitate spectrum sharing with other devices. It comprises channel structure, MAC frame formats and MAC functions and the operative frequency band is the ISM frequency band from 2.4 GHz to 2.4835 GHz.

The above three standards [1]-[3] provide merely some hints for implementing the mechanisms described in the present invention. They provide the means to modify super-frame related allocations and parameters in limited ways. More specifically, standard [1] does not allow data communications between Hubs. Standard [1] has an optional mode for multiple WBANs to coexist in the same radio channel. The Hubs may exchange specific control messages to align their active periods so that they do not overlap. This potentially requires super-frame reallocations from both coexistent WBANs. It is meant for coexistence purposes only. It enables modification of channel access periods, but not super-frame duration modifications on super-frame-by-frame basis. Standards [2] and [3] provide the possibility to change inter-beacon interval (i.e. IBI) on a super-frame-by-frame basis, but they do not provide any specifications for realignment of the IBI.

Wireless network research has identified over the years various mechanisms for realigning super-frames, such as the following references [4]-[8]:

Draft Standard [4]: "P802.15.8 / D4, Draft Standard for Wireless Medium Access Control (MAC) and Physical Layer (PHY) Specifications for Peer Aware Communications (PAC), March 2017"

Reference [5]: Muthukumaran P., de Paz R., Spinar R., Pesch D., "MeshMAC: Enabling Mesh Networking over IEEE 802.15.4 through Distributed Beacon Scheduling", Ad Hoc Networks (ADHOCNETS 2009). Lecture Notes of the Institute for Computer Sciences, Social Informatics and Telecommunications Engineering, vol 28. Springer, Berlin, Heidelberg, 2010

Reference [6]: H. Shabani, M. M. Ahmed, S. Khan, S. A. Hameed and M. Hadi Habaebi, "Smart Zigbee/IEEE 802.15.4 MAC for wireless sensor multi-hop mesh networks," 2013 IEEE 7th International Power Engineering and Optimization Conference (PEOCO), Langkawi, pp. 282-287, 2013

Reference [7]: B. H. Lee and H. K. Wu, "Study on a Dynamic Superframe Adjustment Algorithm for IEEE 802.15.4 LR-WPAN," 2010 IEEE 71st Vehicular Technology Conference, Taipei, pp. 1-5, 2010

Reference [8]: M. Bennis and J. Lilleberg, "Inter Base Station Resource Sharing and Improving the Overall Efficiency of B3G Systems," 2007 IEEE 66th Vehicular Technology Conference, Baltimore, Md., pp. 1494-1498, 2007

However, all of the proposed mechanisms aim at improving the channel resource utilisation of the existing wireless network, and not for aligning individual networks to enable communications between such networks. The draft standard [4] explicitly establishes peer-aware communications groups and establishes an overlay cyclic-super-frame structure with clearly defined periods for synchronisation, discovery, and peering. Potentially any device can be a member of such group, not only hubs, but there are no specifications, how an existing hub coordinated network and an overlay cyclic-super-frame coexist. Furthermore, there are no specifications for realignment of these kinds of different networks, which is the subject-matter of the present invention.

Summarizing the starting point of the present invention, the main problem in the prior art is thus that neither the fore-mentioned IEEE nor the ETSI standards provide a solution for super-frame realignment of WBAN networks using the same standard specifications in near vicinity.

SUMMARY OF THE INVENTION

The present invention provides a WBAN compliant mechanism for super-frame realignment with other neighbouring WBAN networks while maintaining uninterrupted operations of both the wireless network carrying out the realignment and the wireless networks whose super-frame structure are to be aligned with. The super-frame realignment mechanism is further applicable to other similar type networks of their corresponding neighbour networks. Moreover, the present invention provides means for network alignment to initiate data communications between two wireless networks without forming a parent-child hierarchy. The two wireless networks may or may not operate on the same radio channel.

The present invention is dependent on having information of the other wireless network to be aligned with. This information may be obtained by several mechanisms, such as neighbour discovery as described in a non-published patent application "Neighbour wireless sensor network discovery mechanism" filed in 7 Nov. 2017 by the same Applicant, or alternatively, by out-of-band signaling. Therefore, the execution of the algorithm presented in "Neighbour wireless sensor network discovery mechanism" is not a necessity for the proper execution of the algorithm disclosed in the present invention.

The present invention introduces a method and a system for super-frame realignment to enable inter-wireless network communications.

The first inventive aspect comprises a super-frame realignment method to enable inter-wireless network communications, where an own network and a target network already exist, wherein the own network and the target network comprise a data channel, wherein the data channel comprises a beacon to be transmitted, respectively; channels are predetermined and beacon formats of their data channels are known; and an inter-beacon-interval (i.e. IBI) of the data channel of the own network and the target network, respectively, comprises an active period followed by an inactive period. The method is characterized in that the method further comprises the steps of checking whether the IBI of the data channel of the own network is of shorter or longer duration than the IBI of the data channel of the target network, and if the IBI of the data channel of the own network does not have exactly the same duration as the IBI of the data channel of the target network, the own network allocates its own inactive and/or active periods so that an integer multiple of its forthcoming IBI will correspond to the IBI of the target network, or the forthcoming IBI of the own network will correspond to an integer multiple of the IBI of the target network.

In an embodiment of the invention, the method comprises the step of allocating inactive and/or active periods so that the IBI of the data channel of the own network corresponds to an integer multiple of the IBI of the data channel of the target network, if the IBI of the data channel of the own network is more than the IBI of the data channel of the target network.

In an embodiment of the invention, the method comprises the step of allocating inactive and/or active periods so that the IBI of the data channel of the own network corresponds to the IBI of the data channel of the target network, if the IBI of the data channel of the own network is less than the IBI of the data channel of the target network but more than half of the IBI of the data channel of the target network.

In an embodiment of the invention, the method comprises the step of allocating inactive and/or active periods so that the integer multiple of the IBI of the data channel of the own network corresponds to the IBI of the data channel of the target network, if the IBI of the data channel of the own network is less than half of the IBI of the data channel of the target network.

In an embodiment of the invention, the method comprises the step of allocating channel resources of the own network so that a Hub of the own network is able to receive data channel beacons of a Hub of the target network.

In an embodiment of the invention, the method comprises the step of reporting to an issuing higher layer entity with a response of 'Complete' with an indication of a success or an error code.

In an embodiment of the invention, only the inactive period is changed when performing the allocation by the own network.

In an embodiment of the invention, if the IBI of the data channel of the own network is longer than the IBI of the data channel of the target network, but shorter than 2*IBI of the data channel of the target network, changing the inactive period allocation so that the changed IBI of the data channel of the own network is twice the IBI of the data channel of the target network, and the data channel beacons of the target network will fall into the changed inactive periods of the own network for all forthcoming IBIs.

In an embodiment of the invention, the own network and the target network are Wireless Body Area Networks (WBANs) according to IEEE standard 802.15.6 and/or ETSI technical committee SmartBAN specifications.

According to a second inventive aspect of the present invention, it comprises a super-frame realignment system to enable inter-wireless network communications, where an own network and a target network already exist, wherein the own network and the target network comprise a data channel, wherein the data channel comprises a beacon to be transmitted, respectively; channels are predetermined and beacon formats of their data channels are known; and an inter-beacon-interval (IBI) of the data channel of the own network and the target network, respectively, comprises an active period followed by an inactive period. The system is characterized in that the system further comprises a controller configured to check whether the IBI of the data channel of the own network is of shorter or longer duration than the IBI of the data channel of the target network, and if the IBI of the data channel of the own network does not have exactly the same duration as the IBI of the data channel of the target network, the own network is configured to allocate its own inactive and/or active periods so that an integer multiple of its forthcoming IBI will correspond to the IBI of the target network, or the forthcoming IBI of the own network will correspond to an integer multiple of the IBI of the target network.

In an embodiment of the invention, the system further comprises the controller configured to allocate inactive and/or active periods so that the IBI of the data channel of the own network corresponds to an integer multiple of the IBI of the data channel of the target network, if the IBI of the data channel of the own network is more than the IBI of the data channel of the target network.

In an embodiment of the invention, the system further comprises the controller configured to allocate inactive and/or active periods so that the IBI of the data channel of the own network corresponds to the IBI of the data channel of the target network, if the IBI of the data channel of the own network is less than the IBI of the data channel of the target network but more than half of the IBI of the data channel of the target network.

In an embodiment of the invention, the system further comprises the controller configured to allocate inactive and/or active periods so that the integer multiple of the IBI of the data channel of the own network corresponds to the IBI of the data channel of the target network, if the IBI of the data channel of the own network is less than half of the IBI of the data channel of the target network.

In an embodiment of the invention, the system further comprises the controller configured to allocate channel resources of the own network so that a Hub of the own network is able to receive data channel beacons of a Hub of the target network.

In an embodiment of the invention, the system further comprises the controller configured to report to an issuing higher layer entity with a response of 'Complete' with an indication of a success or an error code.

In an embodiment of the invention, only the inactive period is changed when performing the allocation by the own network.

In an embodiment of the invention, if the IBI of the data channel of the own network is longer than the IBI of the data channel of the target network, but shorter than 2*IBI of the data channel of the target network, the controller is configured to change the inactive period allocation so that the changed IBI of the data channel of the own network is twice the IBI of the data channel of the target network, and the data channel beacons of the target network will fall into the changed inactive periods of the own network for all forthcoming IBIs.

In an embodiment of the invention, the own network and the target network are Wireless Body Area Networks (WBANs) according to IEEE standard 802.15.6 and/or ETSI technical committee SmartBAN specifications.

DETAILED DESCRIPTION OF THE INVENTION

The present invention concentrates in wireless body area networks (WBANs). WBANs apply to e.g. medical and healthcare monitoring systems in the vicinity of a human body, inside the human body, or on or in a machine body. A WBAN can be called as a wireless network comprising wearable or mounted computing devices. The devices can be implemented inside the body tissue, on the skin, or within an implant, or as a surface-mounted device on the body in a fixed position. Some devices may also be carriable in the clothes of the user, in the user's hand, or mounted on a technological apparatus, for instance.

Low power consumption is essential for the WBAN devices. Furthermore, it is important that the used devices do not pose any biological or practical harm to the user carrying these devices.

Usually the sensors in the WBAN collect physiological changes or other information present within the patient or e.g. his/her movement, and the WBAN sensors transmit the gathered data to an external processing unit. In this manner, the doctor may physically locate anywhere and such a professional may access the data from anywhere through a cloud computation system. Certain alarms can be set and triggered if a certain measurement result gives a reason to be worried, or at least, if there is a life-threatening change in the patient's measured condition.

As already cited in the background, the standard which governs the WBANs is IEEE 802.15.6. Furthermore, the ETSI technical committee "SmartBAN" has defined physical layer and medium access control specifications for packet-based short-range communications in WBANs.

Discussing now the general facts of the SmartBAN compliant networks, such a SmartBAN network operates in two physical channels. The first physical channel is a control channel (abbreviated as CCH) and the second physical channel is a data channel (DCH). The control channel is used in initialising the network. The CCH may be a distinct logical or physical radio channel. The coordinating entity of the SmartBAN network, i.e. a Hub, transmits control channel beacons (i.e. C-beacons) in the control channel where the C-beacons are transmitted periodically. The C-beacon may thus occur in either a distinct logical or physical radio channel. The C-beacon is always transmitted by a Hub device. Furthermore, there may exist multiple control channels and the Hub knows them all.

Additionally, actual data transmissions are carried out in the data channel in which the Hub transmits a data channel beacon (i.e. D-beacon). The D-beacons are also transmitted periodically where the time period between two consecutive D-beacons can be called as an inter-beacon interval (i.e. IBI). The IBIs in turn can be divided in four distinct parts: Beacon Period, Scheduled Period, Control and Management Period, and Inactive period. The three first Periods are conceptually labeled as an active period. The active period commences at the start of Beacon Period and the active period is followed by the inactive period. After the end of the inactive period, a new D-beacon is transmitted at the beginning of a new Beacon Period. Only the Hub is allowed to transmit during the Beacon Period. The difference between the active and inactive periods is that in the active period, the devices, including the Hub, are allowed to transmit or receive over the DCH. The inactive period is specified as a period in time following an active transmission sequence during which the equipment does not transmit or receive over the DCH.

Regarding the definitions of the parts present in the inter-beacon interval, it is possible in another embodiment to define the IBI so that it comprises an inactive period and after the inactive period, an active period will follow. The active period comprises the three distinct parts as mentioned in the previous paragraph. In this regard, the IBI comprises an active period and an inactive period (regardless of their mutual order), and a new beacon is transmitted at the beginning of a new Beacon Period.

According to the present invention and according to the notation used by the inventors currently, the inactive period stands for the portion of the IBI where devices of the network other than the Hub are not allowed to transmit or receive over the channel. This means that the Hub is allowed to transmit and receive even during the inactive period. It can be thus deduced that in case there is a transmission or reception in the inactive period of the IBI, the transmitting or receiving entity must then always be the Hub.

It is notable that this is a slightly broadened interpretation of the inactive period by the inventors compared to the inactive period determined currently in the standard [3].

Summarising the difference between the active and inactive periods in other words, the active period stands for the portion of the inter-beacon interval (IBI) where devices of the network may transmit data or control frames, as coordinated by the respective network Hub. The inactive period stands for the portion of the IBI where devices of the network other than the Hub are not allowed to transmit or receive over the channel.

The present invention concentrates on providing a SmartBAN compliant mechanism for super-frame realignment with other neighbouring SmartBAN networks while maintaining uninterrupted operations of both the wireless network carrying out the realignment and the wireless networks whose super-frame structure are to be aligned with. The super-frame realignment mechanism is further applicable to other similar type networks of their corresponding neighbour networks.

A SmartBAN network thus operates in two physical channels: a control channel (CCH) and a data channel (DCH). The CCH is only utilised for network initialisation and transmitting periodic control channel beacons (C-Beacons) by the coordinator of a SmartBAN, called Hub. Data transmissions are carried out in the DCH, in which the Hub transmits a periodic data channel beacon (D-Beacon). The period between two consecutive D-Beacons is termed as inter-beacon interval (IBI) with duration $T_D$, which is further divided into two parts, active and inactive. Devices other than the Hub on the SmartBAN network are only allowed to transmit during the active part of the IBI.

The super-frame realignment mechanism to enable inter-wireless sensor network communications in the present invention operates as follows. When requested (i.e. issued) by a higher layer entity to initiate super-frame realignment with another wireless network, the Hub initiates the following sequence of actions. Firstly, the Hub checks whether its $T_D$ is of shorter or longer duration than the target wireless network's $T_D$. Secondly, if the Hub's $T_D$ does not have exactly the same duration as the target Hub's $T_D$, the Hub allocates its own inactive and/or active periods so that an integer multiple of its forthcoming $T_D$ will correspond to the target Hub's $T_D$ or the Hub's $T_D$ will correspond to an integer multiple of the target Hub's $T_D$. Thirdly, the Hub allocates it own network's channel resources so that it is capable of receiving the target Hub's D-Beacons. Lastly, the Hub reports back to the higher layer entity with a response of 'Complete' with indication of a success or an error code.

Figure 1:
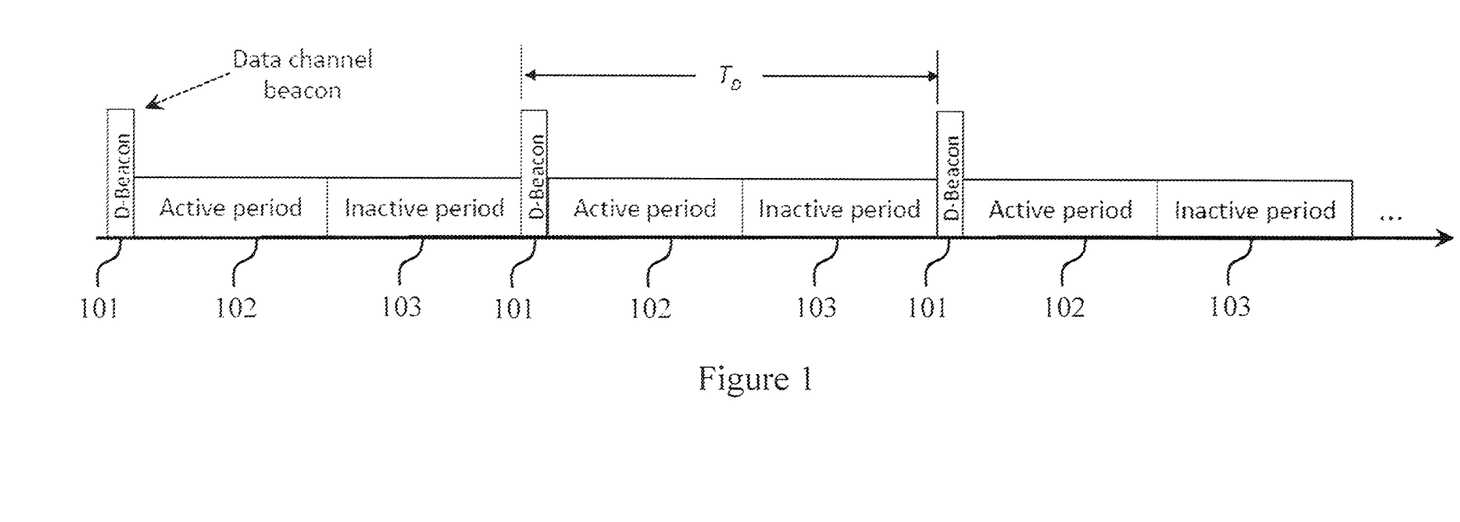
FIG. 1 illustrates an example of a super-frame structure in a beacon-enabled network.
Figure 2A:
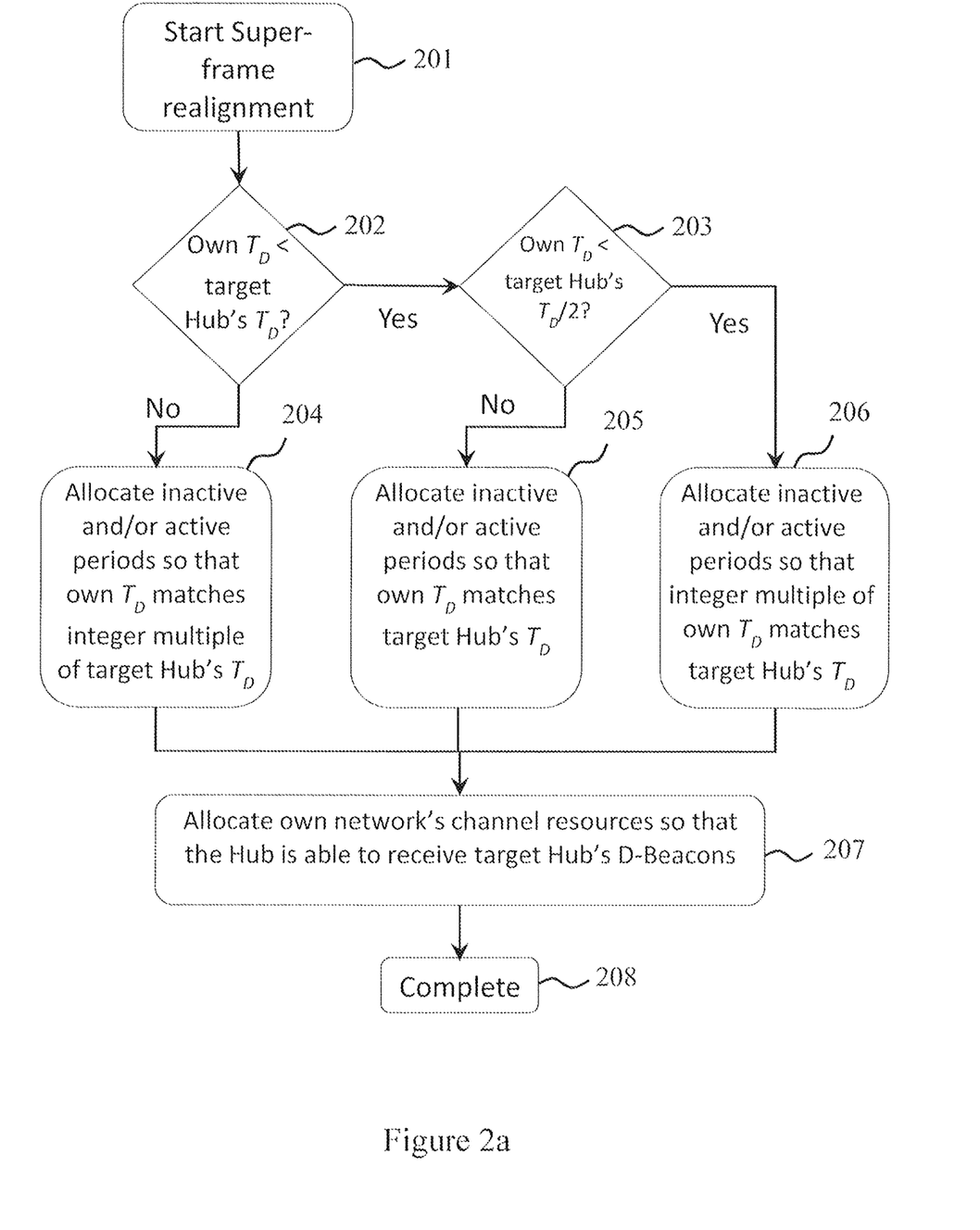
FIG. 2a illustrates a flowchart of the super-frame realignment mechanism in its $1^{st}$ embodiment.
Figure 2B:
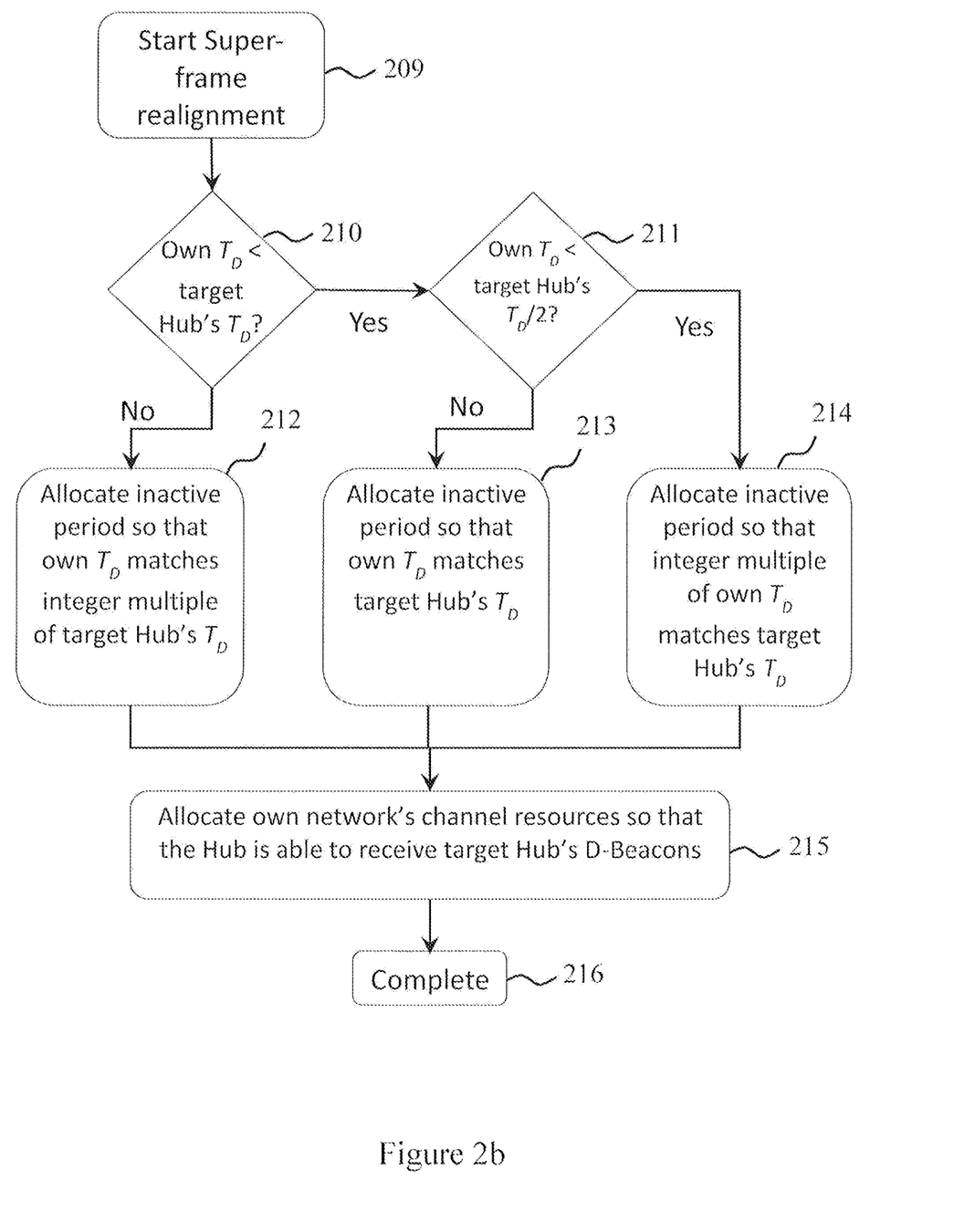
FIG. 2b illustrates a flowchart of the super-frame realignment mechanism in its $2^{nd}$ embodiment.
Figure 3:
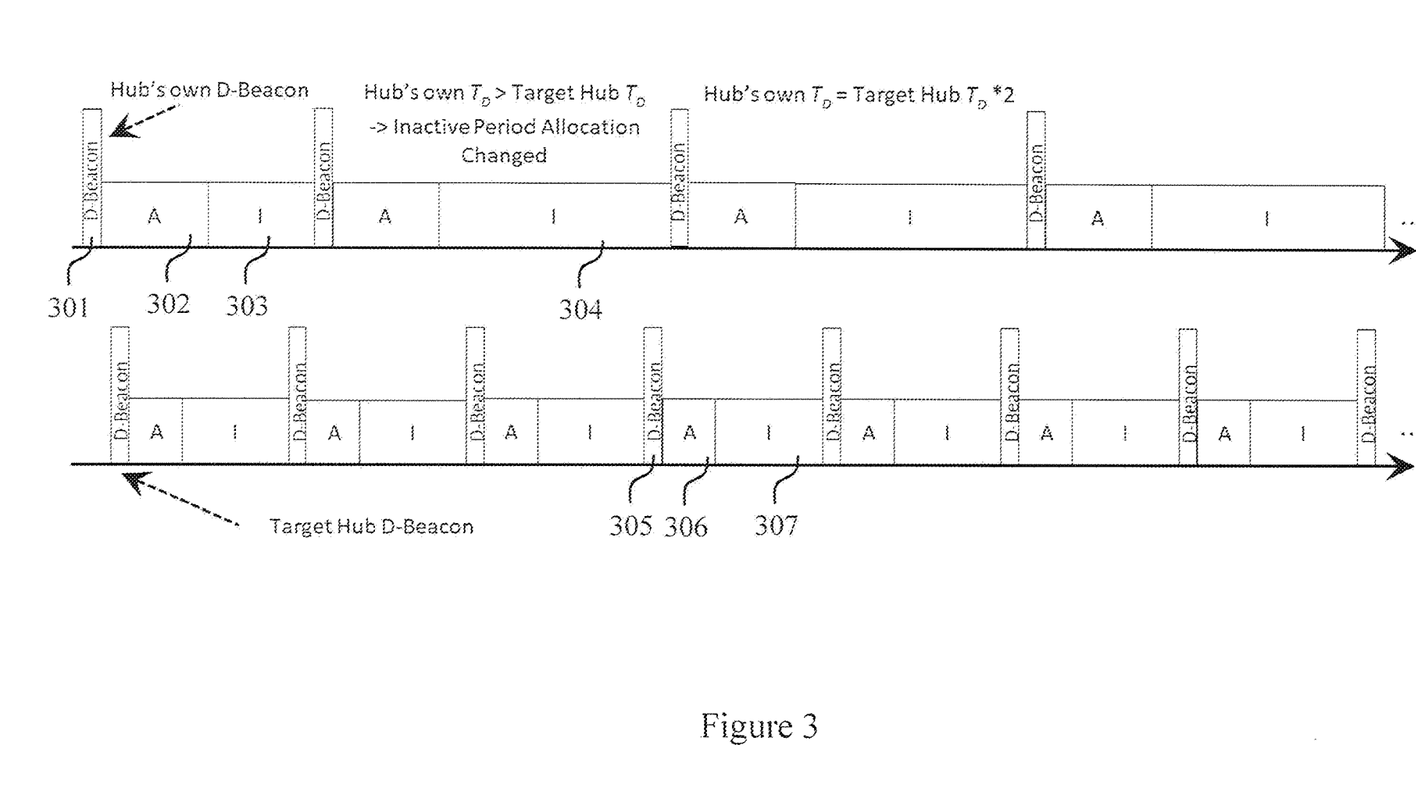
FIG. 3 illustrates an example of super-frame realignment in a beacon-enabled wireless network.

Now going in more detailed embodiments and referring to the drawings, FIG. 1 illustrates an example of a super-frame structure in a beacon-enabled network, FIG. 2a illustrates a flowchart of the super-frame realignment mechanism in its 1$^{st}$ embodiment, FIG. 2b illustrates a flowchart of the super-frame realignment mechanism in its 2$^{nd}$ embodiment, and FIG. 3 illustrates an example of super-frame realignment in a beacon-enabled wireless network.

Regarding generally the notation used in FIGS. 1-3, a D-Beacon 101 stands for the periodic data channel beacon, which may occur in either a distinct logical or physical radio channel. There may be multiple data channels in an embodiment of the invention. The D-Beacon is always transmitted by a Hub device. The active period 102 ('A' in FIG. 3) stands for the portion of the inter-beacon interval (IBI), where devices of the network may transmit data or control frames, as coordinated by the respective network Hub. The inactive period 103 ('I' in FIG. 3) stands for the portion of the IBI, where devices of the network other than the Hub are not allowed to transmit or receive over the channel. $T_D$ stands for the IBI duration.

As FIG. 1 illustrates as an example of a super-frame structure in beacon-enabled wireless network, the D-beacon 101 (=Data channel beacon) is followed by an Active Period 102, which in turn is followed by an Inactive Period 103. The 101, 102 and 103 together form an IBI (i.e. $T_D$). After an Inactive Period 103, a new D-beacon 101 is transmitted, and the similar structure continues in a periodic fashion.

Going now to the steps of the algorithm itself in its first embodiment according to the present invention, the flow-chart of FIG. 2a of super-frame realignment mechanism defines the following steps:

1. A Hub initiates the super-frame realignment mechanism by a higher layer entity issuing 'Start Super-frame realignment' 201.
2. The Hub checks if its own To is shorter than target Hub's $T_D$ 202.
   a. If the Hub's own $T_D$ is longer than the target Hub's $T_D$, the Hub allocates inactive and/or active periods so that its own $T_D$ matches integer multiple of the target Hub's $T_D$ 204.
   b. If the Hub's own $T_D$ is shorter than the target Hub's $T_D$, the Hub checks if its own $T_D$ is shorter than target Hub's $T_D/2$ 203.
   c. If the Hub's own $T_D$ is shorter than the target Hub's $T_D$ but longer than the target Hub's $T_D/2$, the Hub allocates inactive and/or active periods so that its own To matches the target Hub's $T_D$ 205.
   d. If the Hub's own $T_D$ is shorter than the target Hub's $T_D/2$, the Hub allocates inactive and/or active periods so that integer multiple of its own $T_D$ matches the target Hub's $T_D$ 206.
3. The Hub allocates own network channel resources to itself in a way that it is able to receive target Hub's D-Beacons 207.
4. The Hub reports back to the issuing higher layer entity with a response of 'Complete' 208 with an indication of a success or an error code.

Going now to the steps of the algorithm in its second embodiment according to the present invention, the algorithm is otherwise the same as in the above, steps 1-4, but the manipulation (i.e. allocation) is only applied to inactive periods. This flow chart is shown in FIG. 2b. In other words, the second embodiment of the algorithm comprises the steps of:

1. A Hub initiates the super-frame realignment mechanism by a higher layer entity issuing 'Start Super-frame realignment' 209.
2. The Hub checks if its own This shorter than target Hub's $T_D$ 210.
   a. If the Hub's own $T_D$ is longer than the target Hub's $T_D$, the Hub allocates inactive period so that its own $T_D$ matches integer multiple of the target Hub's To 212.
   b. If the Hub's own $T_D$ is shorter than the target Hub's $T_D$, the Hub checks if its own $T_D$ is shorter than target Hub's $T_D/2$ 211.
   c. If the Hub's own $T_D$ is shorter than the target Hub's $T_D$ but longer than the target Hub's $T_D/2$, the Hub allocates inactive period so that its own $T_D$ matches the target Hub's $T_D$ 213.
   d. If the Hub's own $T_D$ is shorter than the target Hub's $T_D/2$, the Hub allocates inactive period so that integer multiple of its own $T_D$ matches the target Hub's $T_D$ 214.
3. The Hub allocates own network channel resources to itself in a way that it is able to receive target Hub's D-Beacons 215.
4. The Hub reports back to the issuing higher layer entity with a response of 'Complete' 216 with an indication of a success or an error code.

Now moving to a possible end result in one embodiment of the invention, FIG. 3 illustrates an example of super-frame realignment in a beacon-enabled wireless network. Hub's own D-beacon is 301, its active period is 302, its initial inactive period is 303, and its (re)allocated, i.e. changed, inactive period is 304. Furthermore, the target Hub's D-beacon is 305, its active period is 306 and its inactive period is 307. At the initial phase, the Hub has detected that its own $T_D$ is longer than the target Hub's $T_D$, but shorter than the target Hub's $T_D*2$. This corresponds to step 210->decision "No" in FIG. 2b. Therefore, the Hub allocates its own network's inactive period (303->304) so that the own network's $T_D$ matches with the target Hub's $T_D*2$ (corresponding to step 212; in this case the integer must be =2). In other words, the inactive period allocation is changed, i.e. in this example increased, from inactive period length 303 to a new inactive period length 304 of the own Hub. After completing the super-frame realignment mechanism, the target Hub's D-beacons 305 take always place during the inactive period 304 of the Hub's network. Since other devices than the Hub are not allowed to transmit or receive over the channel during the inactive period, in this example the Hub can allocate its own network channel resources to itself for receiving the target Hub's D-beacons 305 without changing the allocations of the devices on its network.

The algorithm, i.e. mechanism, according to the present invention comprises the following advantages. The present invention provides a mechanism for super-frame alignment with other neighbouring networks without interrupting the on-going operations of either the wireless network carrying out the realignment or the wireless networks to be aligned with. Current prior art methods either do not provide for such a mechanism or they require a shutdown of the existing discovering network and its re-establishment as a child network of another wireless network after such network's discovery and association to it. Moreover, the present invention provides the means for network alignment to initiate data communications between two wireless networks without forming a parent-child hierarchy. The two wireless networks may or may not operate on the same radio channel. Furthermore, current related standards aim at coexistence of the networks, and not interoperability of the networks. The present invention indeed provides means for interoperability between networks.

The present invention can be implemented as a piece of software in the WBAN system, where the software can be executed in the controller applying the method steps discussed above. The software, i.e. the computer program(s), can be implemented as a single or several computer programs saved in a memory of a device, which is a part of the system. Of course, the software may be stored fully or partly in an external server or in a cloud service from where it can be transferred to be executed by the controller, i.e. processor, of the WBAN system.

The present invention is not restricted to embodiments disclosed above but the invention may vary within the scope of the claims.

The invention claimed is:

1. A super-frame realignment method to enable inter-wireless network communications between an own network and a target network,
   wherein the own network and the target network each comprises a data channel (DCH) and beacon formats of the data channels of the own network and the target network are known,
   wherein the data channels of the own network and the target network are predetermined and each of the data channels of the own network and the target network comprises a beacon to be transmitted respectively, and
   an inter-beacon-interval (IBI) of the data channel (DCH) of the own network and an inter-beacon-interval (IBI) of the data channel (DCH) of the target network, respectively, each comprises an active period followed by an inactive period,
   wherein the method comprises the steps of
   checking whether the IBI of the data channel of the own network is of shorter or longer duration than the IBI of the data channel of the target network, and responsive to determining that the IBI of the data channel of the own network does not have exactly the same duration as the IBI of the data channel of the target network, the own network allocates its own inactive and/or active periods so that an integer multiple of its forthcoming IBI will correspond to the IBI of the target network, or the forthcoming IBI of the own network will correspond to an integer multiple of the IBI of the target network, and wherein the own network and the target network operate on different radio channels.

2. The method according to claim 1, wherein the method comprises the step of allocating inactive and/or active periods so that the IBI of the data channel of the own network corresponds to an integer multiple of the IBI of the data channel of the target network responsive to determining that the IBI of the data channel of the own network is more than the IBI of the data channel of the target network.

3. The method according to claim 1, wherein the method comprises the step of allocating inactive and/or active periods so that the IBI of the data channel of the own network corresponds to the IBI of the data channel of the target network, responsive to determining that the IBI of the data channel of the own network is less than the IBI of the data channel of the target network but more than half of the IBI of the data channel of the target network.

4. The method according to claim 1, wherein the method comprises the step of allocating inactive and/or active periods so that the integer multiple of the IBI of the data channel of the own network corresponds to the IBI of the data channel of the target network, responsive to determining that the IBI of the data channel of the own network is less than half of the IBI of the data channel of the target network.

5. The method according to the claim 1, wherein that the method comprises the step of allocating channel resources of the own network so that a Hub of the own network is able to receive data channel beacons of a Hub of the target network.

6. The method according to claim 5, wherein the method comprises the step of reporting to an issuing higher layer entity with a response of 'Complete' with an indication of a success or an error code.

7. The method according to claim 1, wherein only the inactive period is changed when performing the avocation by the own network.

8. The method according to claim 7, wherein responsive to determining that the IBI of the data channel of the own network is longer than the IBI of the data channel of the target network, but shorter than 2*IBI of the data channel of the target network, changing the inactive period allocation so that the changed IBI of the data channel of the own network is twice the IBI of the data channel of the target network, and the data channel beacons of the target network will fall into the changed inactive periods of the own network for all forthcoming IBIs.

9. The method according to claim 1, wherein the own network and the target network are Wireless Body Area Networks (WBANs) according to IEEE standard 802.15.6 and/or ETSI technical committee SmartBAN specifications.

10. A super-frame realignment system to enable inter-wireless network communications between an own network and a target network,
wherein the own network and the target network each comprises a data channel (DCH) and beacon formats of the data channels of the own network and the target network are known,
wherein the data channels of the own network and the target network are predetermined and each of the data channels of the own network and the target network comprises a beacon to be transmitted respectively, and
an inter-beacon-interval (IBI) of the data channel (DCH) of the own network and an inter-beacon-interval (IBI) of the data channel (DCH) of the target network, respectively, each comprises an active period followed by an inactive period,
wherein the system comprises
a hardware controller configured to check whether the IBI of the data channel of the own network is of shorter or longer duration than the IBI of the data channel of the target network, and responsive to determining that the IBI of the data channel of the own network does not have exactly the same duration as the IBI of the data channel of the target network, the own network is configured to allocate its own inactive and/or active periods so that an integer multiple of its forthcoming IBI will correspond to the IBI of the target network, or the forthcoming IBI of the own network will correspond to an integer multiple of the IBI of the target network, and wherein the own network and the target network operate on different radio channels.

11. The system according to claim 10, wherein the system further comprises the controller configured to allocate inactive and/or active periods so that the IBI of the data channel of the own network corresponds to an integer multiple of the IBI of the data channel of the target network responsive to determining that the IBI of the data channel of the own network is more than the IBI of the data channel of the target network.

12. The system according to claim 10, wherein the system further comprises the controller configured to allocate inactive and/or active periods so that the IBI of the data channel of the own network corresponds to the IBI of the data channel of the target network responsive to determining that the IBI of the data channel of the own network is less than the IBI of the data channel of the target network but more than half of the IBI of the data channel of the target network.

13. The system according to claim 10, wherein the system further comprises the controller configured to allocate inactive and/or active periods so that the integer multiple of the IBI of the data channel of the own network corresponds to the IBI of the data channel of the target network responsive to determining that the IBI of the data channel of the own network is less than half of the IBI of the data channel of the target network.

14. The system according to claim 10, wherein the system further comprises the controller configured to allocate channel resources of the own network so that a Hub of the own network is able to receive data channel beacons of a Hub of the target network.

15. The system according to claim 14, wherein that the system further comprises the controller configured to report to an issuing higher layer entity with a response of 'Complete' with an indication of a success or an error code.

16. The system according to claim 10, wherein only the inactive period is changed when performing the allocation by the own network.

17. The system according to claim 16, wherein responsive to determining that the IBI of the data channel of the own network is longer than the IBI of the data channel of the target network, but shorter than 2*IBI of the data channel of the target network, the controller is configured to change the inactive period allocation so that the changed IBI of the data channel of the own network is twice the IBI of the data channel of the target network, and the data channel beacons of the target network will fall into the changed inactive periods of the own network for all forthcoming IBIs.

18. The system according to claim 10, wherein the own network and the target network are Wireless Body Area Networks (WBANs) according to IEEE standard 802.15.6 and/or ETSI technical committee SmartBAN specifications.

* * * * *